US008507634B2

(12) United States Patent
Wu

(10) Patent No.: US 8,507,634 B2
(45) **Date of Patent: *Aug. 13, 2013**

(54) POLYIMIDE INTERMEDIATE TRANSFER BELT

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/975,395

(22) Filed: Dec. 22, 2010

(65) Prior Publication Data

US 2012/0163881 A1 Jun. 28, 2012

(51) Int. Cl.
*C08G 73/10* (2006.01)

(52) U.S. Cl.
USPC ............. 528/170; 399/313; 427/171; 528/45; 528/65; 528/75; 528/173; 528/353

(58) Field of Classification Search
USPC ..................... 399/313; 427/171; 528/45, 65, 528/75, 170, 173, 353
See application file for complete search history.

(56) References Cited

U.S. PATENT DOCUMENTS

| | | | | |
|---|---|---|---|---|
| 5,497,222 | A * | 3/1996 | Landa et al. | 399/308 |
| 6,335,417 | B1 * | 1/2002 | Orikabe et al. | 528/170 |
| 2009/0279925 | A1 * | 11/2009 | Sugimoto et al. | 399/308 |

FOREIGN PATENT DOCUMENTS

| | | | |
|---|---|---|---|
| JP | 2006-104462 | * | 9/2005 |

* cited by examiner

*Primary Examiner* — Gregory Listvoyb

(74) *Attorney, Agent, or Firm* — MH2 Technology Law Group LLP

(57) ABSTRACT

Exemplary embodiments provide an intermediate transfer belt, materials and processes for producing an intermediate transfer belt, and an image transfer apparatus used in electrophotographic printing devices, wherein the intermediate transfer belt can comprise a thermosetting polyimide comprising the reaction product of a polyamic acid and a hydroxyl-terminated polybutadiene.

11 Claims, 2 Drawing Sheets

POLYIMIDE INTERMEDIATE TRANSFER BELT

FIELD OF USE

This disclosure relates generally to improved intermediate transfer belts. More particularly, embodiments relate to an intermediate transfer belt comprising a thermosetting polyimide and processes for making the same.

BACKGROUND

In a typical electrostatographic reproducing apparatus, an image of an original to be copied is recorded in the form of an electrostatic latent image upon a photosensitive member and the latent image is subsequently rendered visible by the application of electroscopic thermoplastic resin particles, commonly known as toner. Generally, the electrostatographic latent image on the photosensitive member is developed by bringing a developer mixture having toner particles in contact with the electrostatographic image. After the image has been developed, the toner particles are typically transferred in image configuration to an intermediate transfer component (web, belt, or the like), and the developed image is subsequently transferred with high transfer efficiency to a permanent, final substrate and fused or fixed via a fixing component.

Intermediate transfer components (web, belt, or the like) are typically formed by applying a polymeric solution onto a substrate and curing the coated substrate to form the intermediate transfer component. A release layer is often applied to the substrate before the polymeric solution is applied in order to prevent the cured coating from adhering to the substrate. Alternatively, the coated substrate can be treated after curing (e.g., immersed in water) to promote release from the substrate. All of this increases production costs, resulting in a more expensive product, or can compromise the integrity of the final product. To lower manufacturing costs, it is desirable to provide improved intermediate transfer members with improved self-release properties, and methods for production thereof.

SUMMARY

According to various embodiments, the present teachings include an intermediate transfer belt comprising a thermosetting polyimide comprising the reaction product of a polyamic acid and a hydroxyl-terminated polybutadiene, materials and methods for producing the intermediate transfer belt, and an image transfer apparatus comprising the intermediate transfer belt.

Additional objects and advantages of the embodiments will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1A:
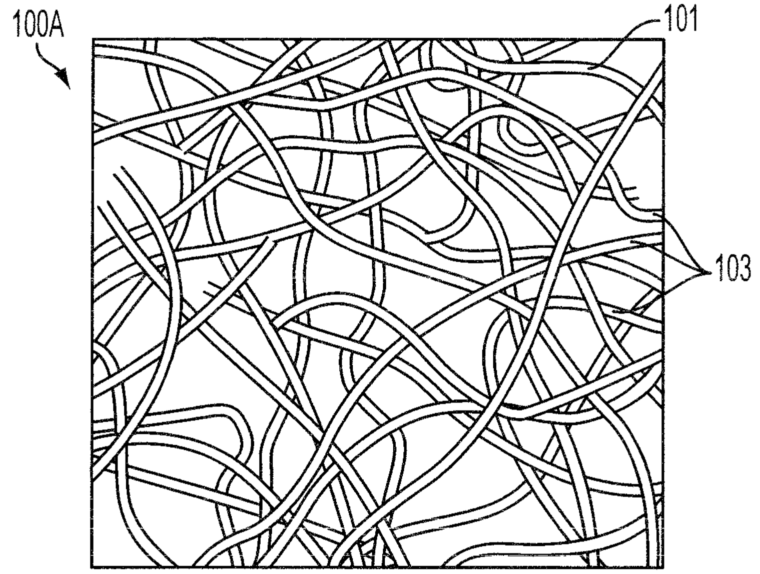
FIGS. 1A-1B depict exemplary portions of intermediate transfer belts in accordance with various embodiments of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to the embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide an intermediate transfer belt and processes for producing thereof. The intermediate transfer belt can comprise a thermosetting polyimide comprising the reaction product of a polyamic acid and a hydroxyl-terminated polybutadiene. The polyamic acid can be present in an amount of from about 90 weight percent to about 99.9 weight percent, from about 95 weight percent to about 99.7 weight percent, or from about 98 weight percent to about 99.2 weight percent of the thermosetting polyimide. The hydroxyl-terminated polybutadiene can be present in an amount of from about 0.1 weight percent to about 10 weight percent or from about 0.3 weight percent to about 5.0 weight percent or from about 0.8 weight percent to about 2.0 weight percent of the thermosetting polyimide.

Suitable polyamic acids can include those formed from reacting diamine monomers and dianhydride monomers. The diamine monomers and dianydride monomers can include aromatic groups, nitrogen, bromine, sulfur, and/or fluorine. In aspects, the polyimide precursor can include aromatic polyimides formed by reacting tetracarboxylic dianhydrides and aromatic diamines.

As disclosed herein, examples of aromatic tetracarboxylic dianhydrides can include pyromellitic dianhydride; 3,3',4,4'-benzophenone tetracarboxylic dianhydride; 3,3',4,4'-biphenyltetracarboxylic dianhydride; 2,3,3',4'-biphenyltetracarboxylic dianhydride; 2,2'-bis-(3,4 dicarboxyphenyl) hexafluoropropane dianhydride; 2,3,6,7-naphthalenetetracarboxylic dianhydride; 1,2,5,6-naphthalenetetracarboxylic dianhydride; 1,4,5,8-naphthalenetetracarboxylic dianhydride; 2,2'-bis(3,4-dicarboxyphenyl)propane dianhydride; bis(3,4-dicarboxyphenyl)sulfone dianhydride; 2,2'-bis-(3,4 dicarboxyphenyl)hexafluoropropane dianhydride; 4,4' oxydiphthalic anhydride; 3,3',4,4'-diphenylsulfonetetracarboxylic anhydride ("DSDA"); 4,4' bisphenol A dianhydride; hydroquinone diphthalic anhydride, and the like. These dianhydrides can be used alone or in combination of two or more.

Examples of aromatic diamines can include diamines in which all of the aromatic groups are arranged substantially in a co-planar manner. As used herein, "substantially" is understood to mean most or all of the aromatic groups are arranged in a co-planar manner. Such diamines include, for example, p-phenylene diamine; m-phenylene diamine; 3,3'-bis(trifluoromethylbenzidine); 2,2'-bis (trifluoromethylbenzidine); o-tolidine; 4,4'-diamino 2,2'-dichlorodimethyl biphenyl; 4,4' oxydianiline; o-tolidine sulfone; 4,4' diaminodiphenyl sulfide, and the like. Other examples of diamines include 4,4'-diaminodiphenylether; 4,4'-diaminodiphenylmethane; 3,3'-diaminodiphenylmethane; p-phenylenediamine; m-phenylenediamine; benzidine; 3,3'-dimethoxybenzidine; 4,4'-diaminodiphenylsulfone; 4,4'-diaminodiphenylsulfide; 4,4'-diaminodiphenylpropane; 2,2'-bis[4-(4-aminophenoxy) phenyl]propane, 4,4'-oxydianiline, and the like. These diamines can be used alone on in combination of two or more.

Exemplary polyamic acids can include at least one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof.

For example, the polyamic acid (PAA) can include a polyamic acid of pyromellitic dianhydride/4,4-oxydianiline, commercially available from industrial Summit Technology Corp., Parlin, N.J. under the trade name PYRE-ML® RC5019 (about 15-16 weight percent PAA in N-methyl-2-pyrrolidone (NMP)). Other commercial examples of suitable polyamic acids include a polyamic acid of pyromellitic dianhydride/4,4-oxydianiline, such as PYRE-ML® RC5057 (about 14.5-15.5 weight percent PAA in NMP/aromatic hydrocarbon=80/20), and PYRE-ML® RC5083 (about 18-19 weight percent PAA in NMP/DMAc=15/85), all commercially available from Industrial Summit Technology Corp., Parlin, N.J. Other commercially available materials include DURIMIDE® 100, commercially available from FUJIFILM Electronic Materials U.S.A., Inc.

The polyamic acid can include a polyamic acid of biphenyl tetracarboxylic dianhydride/4,4'-oxydianiline, such as U-VARNISH A, and U-VARNISH S (about 20 weight percent PAA in NMP), both commercially available from UBE America Inc., New York, N.Y.

The polyamic acid can include a polyamic acid of biphenyl tetracarboxylic dianhydride/phenylenediamine, such as PI-2610 (about 10.5 weight percent PAA in NMP), and PI-2611 (about 13.5 weight percent PAA in NMP), both commercially available from HD MicroSystems, Parlin, N.J.

The polyamic acid can include a polyamic acid of benzophenone tetracarboxylic dianhydride/4,4'-oxydianiline, such as RP46 and RP50 (about 18 weight percent PAA in NMP), both commercially available from Unitech Corp., Hampton, Va.

The polyamic acid can include a polyamic acid of benzophenone tetracarboxylic dianhydride/4,4'-oxydianiline/phenylenediamine, such as PI-2525 (about 25 weight percent PAA in NMP), PI-2574 (about 25 weight percent FAA in NMP), PI-2555 (about 19 weight percent PAA in NMP/aromatic hydrocarbon=80/20), and PI-2556 (about 15 weight percent PAA in NMP/aromatic hydrocarbon/propylene glycol methyl ether=70/15/15), all commercially available from HD MicroSystems, Parlin, N.J.

As disclosed herein, any hydroxyl-terminated polybutadiene (HTPB) can be used. The hydroxyl-terminated polybutadiene can have an average molecular weight ranging from about 200 to about 10,000, for example from about 500 to about 5,000, such as from about 1,000 to about 3,000. The hydroxyl-terminated polybutadiene can have hydroxyl functionality ranging from about 1.6 to about 4.0, such as from about 2.0 to about 4.0, for example from about 2.4 to about 2.6.

The polybutadiene (PB) backbone of the HTPB can be poly(1,3-butadiene), poly(1,4-butadiene), hydrogenated poly (1,3-butadiene), hydrogenated poly(1,4-butadiene), and the like, and mixtures thereof.

Suitable hydroxyl-terminated polybutadienes can be, for example, commercially available polybutadienes such as KRASOL® HLBH-P2000 (hydroxyl hydrogenated PB), HLBH-P3000 (hydroxyl hydrogenated PB), LBH-P2000 (hydroxyl value of 50 mg KOH/g; $M_n$=2,100), LBH-P3000 (hydroxyl value of 37 mg KOH/g; $M_n$=3,000), LBH-P5000, LBH 2000 (hydroxyl value of 52 mg KOH/g; $M_n$=2,100), LBH 3000 (hydroxyl value of 37 mg KOH/g; $M_n$=3,000), LBH 5000 (hydroxyl value of 22 mg KOH/g; $M_n$=5,000), LBH 10000, LBH 2040 (mercaptoethanol PB), POLY BD® R45HT, R45M, R45HTLO (hydroxyl functionality of 2.4-2.6; $M_n$=2,800; $T_g$=−75° C.), LFM, R20LM, and R30LM, all commercially available from Sartomer Company, Warrington, Pa.

The disclosed intermediate transfer belt (ITB) can optionally contain a polysiloxane copolymer to enhance or smooth the coating. The concentration of the polysiloxane copolymer can be less than about 1 weight percent or less than about 0.2 weight percent of the total ITB composition. The optional polysiloxane copolymer can include a polyester modified polydimethylsiloxane (PDMS), commercially available from BYK Chemical under the trade name BYK® 310 (about 25 weight percent PDMS in xylene) and BYK® 370 (about 25 weight percent PDMS in xylene/alkylbenzenes/cyclohexanone/monophenylglycol=75/11/7/7); a polyether modified polydimethylsiloxane, commercially available from BYK Chemical under the trade names BYK® 330 (about 51 weight percent PDMS in methoxypropylacetate) and BYK® 344 (about 52.3 weight percent in xylene/isobutanol=80/20), and BYK®-SILCLEAN 3710 and 3720 (about 25 weight percent PDMS in methoxypropanol); a polyacrylate modified polydimethylsiloxane, commercially available from BYK Chemical under the trade name BYK®-SILCLEAN 3700 (about 25 weight percent PDMS in methoxypropylacetate); or a polyester polyether modified polydimethylsiloxane, commercially available from BYK Chemical under the trade name BYK® 375 (about 25 weight percent PDMS in di-propylene glycol monomethyl ether), and the like, and combinations thereof.

In embodiments, the intermediate transfer belt can further include at least one conductive filler material, such as polyaniline, carbon fillers, metal oxides, and the like. Metal oxides can include copper oxide, zinc oxide, titanium dioxide, tin oxide, doped oxides, and the like. Carbon fillers can include carbon black, graphite, carbon nanotube, graphene and the like. These conductive filler materials can be used alone or in combination of two or more.

Figure 1B:
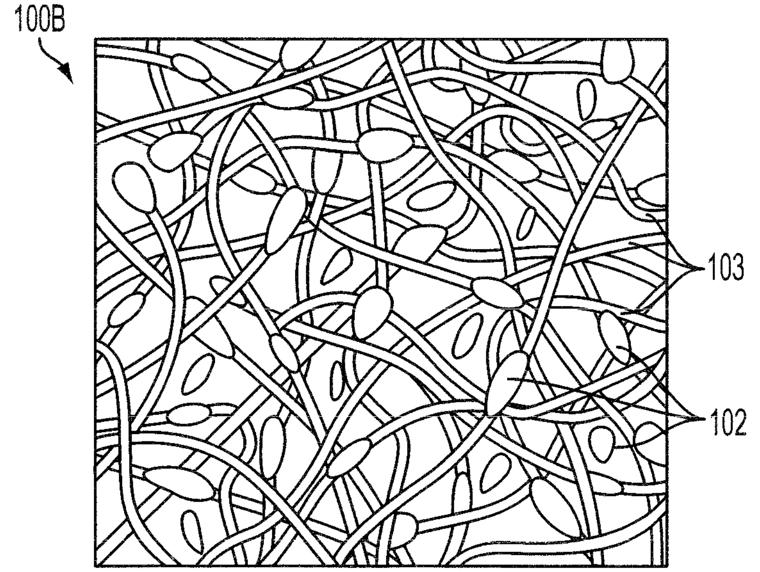

FIGS. 1A-1B depict exemplary portions of intermediate transfer belts in accordance with various embodiments of the present teachings. Specifically, in FIG. 1A, a portion of an intermediate transfer belt 100A can comprise a thermosetting polyimide 101. The thermosetting polyimide 101 can form a polyimide network 103.

As shown in FIG. 1B, a portion of an intermediate transfer belt 100B can include a thermosetting polyimide 101 and at least one conductive filler material 102. The thermosetting polyimide 101 can form a polyimide network 103 with conductive carbon filler material 102 dispersed within the polyimide network 103.

In aspects, the thermosetting polyimide can be present in the intermediate transfer belt (ITB) in an amount ranging from about 75 percent by weight to about 99.9 percent by weight, for example from about 80 percent by weight to about 95 percent by weight, such as from about 85 percent by weight to about 90 percent by weight of total solids in the ITB. "Total solids in the ITB" as used herein is understood to mean the total amount of solids that are present in the ITB, including the thermosetting polyimide, conductive filler materials, and any other fillers or additives in the ITB. The conductive filler material can be present in the ITB in an amount ranging from about 0.1 percent by weight to about 25 percent by weight, for example from about 5 percent by weight to about 20 percent by weight, such as from about 10 percent by weight to about 15 percent by weight of total solids in the ITB.

In an aspect, the intermediate transfer belt can have a high elastic modulus (e.g., Young's modulus). A high elastic modulus can optimize the stretch registration and transfer or transfix conformance for an intermediate transfer belt. In embodiments, the intermediate transfer belt can have a Young's modulus ranging from about 3,000 MPa to about 10,000 MPa, for example from about 3,500 MPa to about 8,000 MPa, such as from about 4,000 MPa to about 6,000 MPa.

In embodiments, processes for producing an intermediate transfer belt are provided herein. In an aspect, a dispersion can be provided comprising a polyimide precursor and a hydroxyl-terminated butadiene, such as those described above. In another aspect, the dispersion further include at least one conductive filler material, such as those described above.

The polyimide precursor and hydroxyl-terminated butadiene can be dispersed in any solvent known in the art so long as the polyimide precursor and HTPB are soluble therein. The dispersion can be applied on a substrate and heated to form a thermosetting polyimide film. The dispersion can be applied on the substrate by any method known in the art including, but not limited to, flow coating, spraying, and the like. In an embodiment, the dispersion is applied in uniform thickness over the substrate. In another embodiment, a release layer is not applied prior to applying the dispersion to the substrate. The substrate can be any substrate known in the art for forming an intermediate transfer belt including, but not limited to, metal (e.g., stainless steel), glass, plastic, combinations thereof, and the like.

The dispersion can comprise a total solids content ranging from about 10 percent by weight to about 30 percent by weight, for example from about 12 percent by weight to about 25 percent by weight, such as about 14 percent by weight to about 20 percent by weight of total solids in the dispersion. "Total solids in the dispersion" as used herein is understood to mean the total amount of solids that are present in the dispersion, including polyimide precursor, hydroxyl-terminated bolybutadiene, conductive filler materials, and any other fillers or additives in the dispersion.

In an aspect, the weight ratio of polyimide precursor, hydroxyl-terminated polybutadiene, and conductive filler material can range from about 96-60:about 1-10:about 3-30. In another aspect, the weight ratio can range from about 88-75:about 2-5:about 10-20. In an embodiment, the weight ratio of polyimide precursor, hydroxyl-terminated polybutadiene, and conductive filler material is 85:2:13.

In embodiments, the coated substrate can be heated to a first temperature ranging from about 70° C. to about 150° C., for example from about 80° C. to about 140° C., such as from about 60° C. to about 130° C., for a period of time ranging from about 10 to about 60 minutes, for example from about 20 to about 40 minutes, such as from about 25 to about 35 minutes. Without being limited by theory, it is believed that the HTPB forms crosslinkages between polyimide precursor polymers (e.g., polyamic acid polymers) in this stage of the reaction.

The coated substrate can be further heated to a second temperature ranging from about 160° C. to about 250° C., for example from about 170° C. to about 220° C., such as about 180° C. to about 200° C., for a period of time ranging from about 10 to about 60 minutes, for example from about 20 to about 40 minutes, such as from about 25 to about 35 minutes. Without being limited by theory, it is believed that the reaction product from the first stage of the reaction further crosslinks and the polyimide precursor (e.g., polyamic acid) effectively imidizes in this stage of the reaction, forming a polyimide network.

The coated substrate can be further heated to a third temperature ranging from about 300° C. to about 350° C., for example from about 310° C. to about 340° C., such as about 320° C. to about 330° C., for a period of time ranging from about 10 to about 90 minutes, for example from about 20 to about 80 minutes, such as from about 40 to about 60 minutes. Without being limited by theory, it is believed that the HTPB cyclizes and any residual polyimide precursor (e.g., polyamic acid) is effectively imidized in this stage of the reaction. Thus, the HTPB is not only chemically attached to the polyimide network but is also cyclized, bringing extra strength and hydrophobicity to the resulting composite thermosetting polyimide film.

The thermosetting polyimide film can be subsequently cooled to about room temperature, whereupon the thermosetting polyimide film can self-release from the substrate without further treatment (e.g., soaking in solvent or water). Without being limited by theory, it is believed that the self-release properties can be due, at least in part, to the increased intrinsic hydrophobicity of the thermosetting polyimide film. The increased intrinsic hydrophobicity is also believed to be beneficial for more complete toner transfer, and cleaning.

Figure 2:
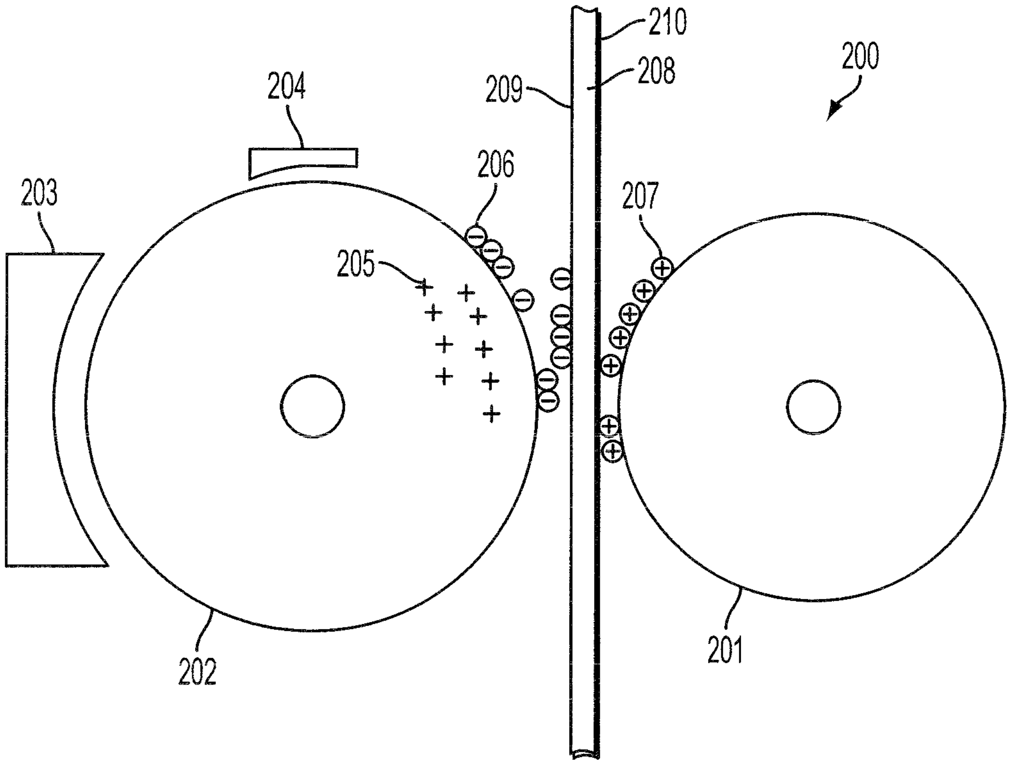
FIG. 2 depicts an exemplary image forming apparatus having an intermediate transfer belt in accordance with various embodiments of the teachings.

In embodiments, an image transfer apparatus can be equipped with an intermediate transfer belt of the present disclosure, as shown in FIG. 2. FIG. 2 depicts an image transfer apparatus 200 comprising an intermediate transfer belt 208 positioned between an imaging member 202 and a transfer roller 201. The imaging member is exemplified by a photoreceptor drum having a charge-retentive surface; however, other appropriate imaging members can include other electrostatographic imaging receptors such as, but not limited to, ionographic belts and drums, electrophotographic belts, and the like.

In FIG. 2, each image being transferred can be formed on the photoreceptor drum 202 by image forming station 203. Each of these images can then be developed at developing station 204 (i.e., having a development component) and transferred to intermediate transfer belt 208. Each of these images can be formed on the photoreceptor drum 202 and developed sequentially, and then transferred to the intermediate transfer belt 208. In the alternative, each image can be formed on the photoreceptor drum 202, developed, and transferred in registration to the intermediate transfer belt 208. The image transfer apparatus 200 can be used in a monochrome copying system or a color copying system.

After the image forming station 203 has formed the latent image on the photoreceptor drum 202 and the latent image has been developed at developing station 204, the charged toner particles 206 from the developing station 204 are attracted and held by the photoreceptor drum 202 because the photoreceptor drum 202 possesses a charge 205 opposite to that of the toner particles 206. In FIG. 2, the toner particles are shown as negatively charged and the photoreceptor drum 202 is shown as positively charged. However, these charges can be reversed, depending on the nature of the toner and the equipment being used. In embodiments, the toner can be present in liquid or dry development systems.

A biased transfer roller 201 positioned opposite the photoreceptor drum 202 has a higher voltage than the surface of the photoreceptor drum 202. As shown in FIG. 2, the biased transfer roller 201 can charge the backside 210 of the intermediate transfer belt 208 with a positive charge. In another embodiment, a corona or other charging mechanism can be used to charge the backside 210 of the intermediate transfer belt 208. The negatively charged toner particles 206 are attracted to the front side 209 of the intermediate transfer belt by the positive charge 207 on the backside 210 of the intermediate transfer belt 208.

EXAMPLES

An intermediate transfer belt was prepared as follows. A mixture of polyamic acid (of pyromellitic dianhydride and 4,4-oxydianiline, commercially available as Pyre-M.L.® RC-5019), hydroxyl-terminated polybutadiene (HTPB) (commercially available as POLY bd® R45HTLO), and carbon black (color: black SB-4, commercially available from Degussa Corp.) in n-methyl-2-pyrrolidone (NMP) solvent was milled at 200 rpm for 6 hours via attritor to provide a dispersion. The weight ratio of polyamic acid to HTPB to carbon black was 85:2:13 in the dispersion, and the dispersion had a total solids content of about 14 weight percent. The dispersion was then coated onto a stainless steel substrate in about uniform thickness.

The coated substrate was subsequently dried at 125° C. for 30 minutes, then 190° C. for 30 minutes, and finally at 320° C. for 60 minutes. The inventive polyimide intermediate transfer belt (ITB) was cooled to about room temperature and exhibited self-release from the substrate. The inventive polyimide ITB had a thickness of 100 μm and exhibited a flat, smooth surface without curl. Both surface resistivity and Young's modulus were measured for the inventive ITB using standard methods, and the results are shown in Table 1. For comparison, data from commercially available polyimide ITBs (A and B) are also included in Table 1.

TABLE 1

| | Surface resistivity (ohm/sq) | Young's modulus (MPa) | ITB release from substrate |
|---|---|---|---|
| Inventive polyimide ITB | $2.6 \times 10^{11}$ | 4,100 | Excellent |
| Comparative ITB (A) | $1.6 \times 10^{11}$ | 3,400 | Needs a release layer |
| Comparative ITB (B) | $5.0 \times 10^{10}$ | 3,300 | Needs a release layer |

The inventive polyimide ITB exhibited higher Young's modulus as compared with commercially available ITBs on the market, which can help optimize stretch registration and transfer or transfix conformance. The inventive polyimide also self-released from the substrate without a release layer applied prior to curing, or subsequent treatment after curing. Additionally, the inventive polyimide ITB demonstrated an onset decomposition temperature of about 576° C., making it extremely heat resistant.

While the disclosure has been illustrated with respect to one or more implementations, alterations and/or modifications can be made to the embodiments without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the disclosure will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. An intermediate transfer belt comprising a thermosetting polyimide consisting of the reaction product of a polyamic acid and a hydroxyl-terminated polybutadiene (HTPB), wherein the reaction product consists of (a) a polyimide network of imidized polyamic acid and (b) cyclized HTPB crosslinks attached to the polyimide network.

2. The intermediate transfer belt of claim 1, wherein the polyamic acid comprises the reaction product of at least one tetracarboxylic dianhydride and at least one aromatic diamine.

3. The intermediate transfer belt of claim 2, wherein the tetracarboxylic dianhydride is selected from the group consisting of pyromellitic dianhydride; 3,3',4,4'-benzophenone tetracarboxylic dianhydride; 3,3',4,4'-biphenyltetracarboxylic dianhydride; 2,3,3',4'-biphenyltetracarboxylic dianhydride; 2,2'-bis-(3,4 dicarboxyphenyl)hexafluoropropane dianhydride; 2,3,6,7-naphthalenetetracarboxylic dianhydride; 1,2,5,6-naphthalenetetracarboxylic dianhydride; 1,4,5,8-naphthalenetetracarboxylic dianhydride; 2,2'-bis(3,4-dicarboxyphenyl)propane dianhydride; bis(3,4-dicarboxyphenyl)sulfone dianhydride; 2,2'-bis-(3,4 dicarboxyphenyl)hexafluoropropane dianhydride; 4,4' oxydiphthalic anhydride; 3,3',4,4'-diphenylsulfonetetracarboxylic anhydride (“DSDA”); 4,4' bisphenol A dianhydride; hydroquinone diphthalic anhydride, and combinations thereof.

4. The intermediate transfer belt of claim 2, wherein the aromatic diamine is selected from the group consisting of p-phenylene diamine; m-phenylene diamine; 3,3'-bis (trifluoromethylbenzidine); 2,2'-bis(trifluoromethylbenzidine); o-tolidine; 4,4'-diamino 2,2'-dichlorodimethyl biphenyl; 4,4' oxydianiline; o-tolidine sulfone; 4,4' diaminodiphenyl sulfide; 4,4'-diaminodiphenylether; 4,4'-diaminodiphenylmethane; 3,3'-diaminodiphenylmethane; p-phenylenediamine; m-phenylenediamine; benzidine; 3,3'-dimethoxybenzidine; 4,4'-diaminodiphenylsulfone; 4,4'-diaminodiphenylsulfide; 4,4'-diaminodiphenylpropane; 2,2'-bis[4-(4-aminophenoxy)phenyl]propane, 4,4'-oxydianiline, and combinations thereof.

5. The intermediate transfer belt of claim 1, wherein the polyamic acid is selected from the group consisting of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and mixtures thereof.

6. The intermediate transfer belt of claim 1, wherein the thermosetting polyimide is present in an amount ranging from about 75 percent by weight to about 99.9 percent by weight of total solids.

7. The intermediate transfer belt of claim 1, further comprising at least one conductive filler material.

8. The intermediate transfer belt of claim 7, wherein the conductive filler material is selected from the group consisting of polyaniline, carbon black, graphite, carbon nanotube, graphene, metal oxides, and combinations thereof.

9. The intermediate transfer belt of claim 7, wherein the conductive filler material is present in an amount ranging from about 0.1 to about 25 percent by weight of total solids.

10. The intermediate transfer belt of claim 1, wherein the belt has a Young’s modulus ranging from about 3,000 MPa to about 10,000 MPa.

11. An image transfer apparatus comprising:

a charge-retentive surface to receive an electrostatic latent image thereon;

a development component to apply toner to said charge-retentive surface for developing said electrostatic latent image; and an intermediate transfer belt comprising a thermosetting polyimide consisting of the reaction product of a polyamic acid and a hydroxyl-terminated polybutadiene (HTPB), wherein the reaction product consists of (a) a polyimide network of imidized polyamic acid and (b) cyclized HTPB crosslinks attached to the polyimide network.

* * * * *